3,582,515
HYDROCARBON OIL EXTENDED
POLYMERCAPTAN RESINS
Frank R. Volgstadt, Painesville, Ohio, and Gene M. Le Fave, El Cajon, Calif., assignors to Diamond Shamrock Corporation, Cleveland, Ohio
No Drawing. Filed Dec. 30, 1968, Ser. No. 788,094
Int. Cl. C08c *11/22;* C08f *45/28;* C08g *51/28*
U.S. Cl. 260—33.6                                                    4 Claims

ABSTRACT OF THE DISCLOSURE

Sealing, caulking and molding compositions containing liquid polymercaptan resins are compounded with petroleum oils such as rubber extender oils and/or foilage spray oils. Resulting compounded materials can be readily pourable and the oil reduces, or eliminates surface tack of resulting cured compositions.

BACKGROUND OF THE INVENTION

Polymercaptan liquid resins are often formulated in part with fillers and pigments, and cured to elastomeric materials useful as sealing, caulking and molding materials. Cured products exhibit desirable tensile strength, elongation, hardness and other properties which enhance the serviceability of such polymers in, for example, construction-type application of caulks, sealants, and glazing materials. Surface tackiness of cured products can however lead to undesirable dirt pick-up after application, leading to undesirable discoloration and unsightliness of exposed surfaces.

SUMMARY OF THE INVENTION

Compounding a polymercaptan resin sealing composition with a petroleum oil containing carbon atoms in aromatic molecules has been found to desirably suppress or completely eliminate surface tack from resulting cured sealant compositions while retaining the desirable elastomeric properties of the polymercaptan resin, for example, tensile strength and tear resistance.

Broadly, the present invention is directed to resinous compositions comprised of liquid mixtures of a liquid polymercaptan resin having an average molecular weight between about 300–25,000 and an SH equivalency of between about 0.05–4.0 milliequivalents per gram of resin, and between about 0.1–60 weight parts, basis 100 weight parts of said liquid resinous material, of a petroleum oil containing up to 50 percent of carbon atoms in aromatics molecules.

DESCRIPTION OF THE PREFERRED EMBODIMENTS

The petroleum oil, or as sometimes referred to herein, the hydrocarbon oil or extender oil, for blending with polymercaptan resin is broadly a straight-run naphtha from a paraffin-base crude or such naphtha optionally chemically treated and from a paraffin-base or mixed-base crude, and including conventionally refined paraffin-base, or solvent-refined mixed-base, stocks. Such oils may contain between about 0.05–50 percent of carbon atoms in aromatic molecules as determined, for example, by a carbon analysis conducted by infrared spectroscopy. Although the presence of a very minor amount of carbon atoms in aromatic molecules can be offset by augmenting the amount of such oil used, usually the use of an oil containing less than about 0.05 percent of carbon atoms in aromatic molecules can lead to an insignificant reduction in surface tack for cured sealing and caulking compositions. Also, oils containing greater than about 50 percent of carbon atoms in aromatic molecules, are generally not employed even in small quantities as they may produce an unsightly, blotchy surface appearance for the sealants and leave an undesirable oily sealant surface. Typically, the oil contains between about 1–35 percent of aromatic carbon atoms.

The petroleum oil usually also contains not substantially above about 30 weight percent of polar compounds, as determined by a clay-gel method such as described in the specifications for the ASTM D 2007 procedure. Typically, such oils contain between about 0.5–10 weight percent of polar compounds. The balance of the oil is essentially always supplied by saturates, first acidaffins, second acidaffins and asphaltenes, although many extender oils are free from asphaltenes or contain a very minor amount, e.g., only a few weight percent or less, of asphaltenes. Additionally, the hydrocarbon oil is one typically having a viscosity above about 40 Saybolt Universal seconds at a temperature of 100° F., but is such an oil having a viscosity not substantially above about 150 Saybolt Universal seconds as determined at a temperature of 210° F. Many of the useful oils are commercially available as rubber extender and processing oils, foilage spray oils, e.g., tree-spray oils, petroleum extender oils, and the like. In addition to the clay-gel method mentioned above, characteristic groups for such oils and their amounts can be alternatively determined by a precipitation method such as specified in ASTM designation D 2006.

The polymercaptan resin component is supplied by liquid polymeric materials such as have been shown in U.S. Pats. 3,258,495 and 3,361,723. These polymercaptan resins are virtually, to completely, free from disulfide linkages, have thiol terminated groups, e.g., thiol terminated side chains, and have polymer chains consisting essentially, to entirely, of carbon, hydrogen, and oxygen atoms with any additional atoms being typically only sulfur and/or halogen. Further, these polymercaptan resins have number average molecular weight between about 300–25,000 and an SH equivalency of between about 0.05–4.0 milliequivalents of mercaptan per gram of polymer. Resins having an SH equivalency below about 0.05 can be highly viscous and difficult to formulate with fillers, pigments, and the like as are polymercaptan resins which have a molecular weight above about 25,000. Resins having an SH equivalency greater than about 4.0 may require especial techniques to achieve desirable characteristics in the cured product. Such resins have an average molecular weight below about 300 form products of retarded elasticity. Preferably, the polymercaptan resins have a number average molecular weight of between about 800–15,000 and an SH equivalency between about 0.2–3.6.

The polymercaptan resins in addition to being virtually, to completely, free from polysulfide linkages are liquid materials prior to cure. Exemplary resins can be prepared from polyepoxides such as polyepoxy-containing polymeric reaction products prepared from a halogen-containing epoxide reacted with an aliphatic polyhydric alcohol. Other suitable polymercaptan resins include thio-containing polyether polymers formed, for example, from dihydric alcohols reacted with alkylene oxides to prepare intermediate products further reacted with halogen-containing epoxides. A portion of these polymercaptan liquid polymers have been described in Sealants, by Adolfas Damusis on pp. 197–204.

The sealing composition typically contains between about 0.1–60 weight parts of extender oil basis 100 weight parts of polymercaptan resin. Use of less than about 0.1 weight part of extender oil can supply insufficient oil to offer enhanced suppression of surface tack in the cured product. Using greater than about 60 weight parts of extender oil can lead to a deleterious loss in the tensile strength of the resulting cured product. Preferably, the extender oil is present in an amount between about 1–40 weight parts based on 100 weight parts of polymercaptan resin.

The resin and oil can be blended together by any suitable means for mixing liquids, and particularly viscous materials. Such mixing can include the incorporation into the blend of other ingredients such as fillers and pigments. Thus, the end composition used may include antioxidants, other resinous materials, pigments, fillers, brighteners, plasticizers, diluents, dyes, cure accelerators, cure retarders, as well as other additives or components which may be formulated into sealing, caulking, or molding compositions.

Curing of the sealant is typically achieved in conventional manner, e.g., by the use of an oxidizing agent in powder, paste, or liquid form, with heat and/or humidity applied to accelerate the cure of the polymercaptan resin. The useful oxidizing systems include metal oxides and peroxides, anionic oxidants, organic redox systems, epoxy resins, organic peroxides, and the like including curing agents activated by atmospheric water.

Compatible mixtures, such as homogeneous liquid blends of hydrocarbon oil plus liquid polymercaptan resin, which do not exhibit rapid phase separation or have suppressed phase separation, upon extended storage, may be stored before use in a single package. A separate package can then contain one or more curing agents plus additional materials, e.g., fillers, pigments, and supplemental extender oil. Mixtures which do not exhibit desirable compatability are typically supplied for use in separate packages with one package containing the polymercaptan resin, optionally with filler and the like and the other package containing the extender oil and such materials as curing agents.

The following example shows a way in which the invention has been practiced but should not be construed as limiting the invention. In the example all parts are parts by weight unless otherwise specified. Also in the example, the following test procedures have been employed.

Tensile strength and percent elongation

Values for these characteristics have been derived by initial testing of cured specimens in accordance with the procedure, and subsequent derivation of the appropriate values in accordance with the calculations, both disclosed in the specifications of ASTM D 412–64T.

Surface tack

Surface tack is measured manually by first pressing one or more fingers onto the surface of the sample with moderate pressure. Thereafter the tack is evaluated, generally among several samples, by experiencing the resistance encountered to removal of the fingers from the surface. In this manner tack is evaluated according to a relative scale between samples of no tack, slight, medium, or heavy tack.

Tear resistance

The tear resistance for cured elastomer samples is evaluated in accordance with the procedures prescribed in ASTM D 624–54 for both the Die A and the Die C procedures of such specification.

EXAMPLE

The polymercaptan resin employed is a water white liquid having a pH of 8.3, a molecular weight of about 5000 and a mercaptan equivalent, expressed as milliequivalents of SH functionality per gram of resin, of 0.35, as measured by iodimetric titration. The resin is prepared from a propylene oxide derivative of trimethylol propane, which derivative is then reacted with epichlorohydrin and then subsequently with sodium sulfhydrate to prepare the polymercaptan resin. The extender oil used contains 50 percent paraffinic carbon, 45 percent naphthenic carbon, and 5 percent aromatic carbon by ring analysis, has a viscosity at 100° F. of 67.2 S.S.U., a molecular weight of 282, with an ASTM distillation of 5% off at 580° F. and 66 percent off at 636° F.

To 100 parts of the polymercaptan resin plus 15 parts of the extender oil there is blended 30 parts of dibutyl phthalate, 70 parts of precipitated calcium carbonate, 50 parts of barytes, and 30 parts of silica. The calcium carbonate has a specific gravity of 2.65 and an average particle size of 0.05 micron; the barytes is a minimum of 98.5 percent barium sulfate, and has a specific gravity of 4.46 with 100 percent of the particles being less than 20 microns. The silica is a minimum of 98.5 percent silica and has a specific gravity of 2.65 with 100 percent of the particles less than 15 micron in diameter.

These materials are blended together along with a very minor amount of a silicone antifoam agent having a specific gravity at 25°/25° C. of 0.98 and a viscosity at 25° C. of 1000–5000 centistokes. The mixture is de-gassed under a pressure of about 30 mm. Hg, brought back to normal pressure and cured by the addition of 5 parts of cumene hydroperoxide. Samples from the resulting cured product are then subjected to testing as described hereinabove. Such testing is also performed on samples from a comparative cured product prepared in the manner described hereinbefore from the above described materials except that the extender oil is omitted. Results of such testing are shown in the table below.

TABLE

| Test | Oil-containing composition | Oil-free composition |
| --- | --- | --- |
| Percent elongation | 393 | 365 |
| Tensile strength, p.s.i | 114.6 | 102.4 |
| Tear resistance: | | |
| Die A | 21.7 | 17.93 |
| Die C | 26.6 | 17.8 |
| Surface tack | (¹) | (²) |

¹ No tack.
² High tack.

As can be seen from the above results the cured product containing the extender oil essentially retains, or desirably enhances the physical properties, e.g., tensile strength and tear resistance, for the sealant composition, when compared with the oil-free product. Also, such oil-extended sealant shows an excellent suppression of surface tack.

It is to be understood that, although the invention has been desrcibed with specific reference to particular embodiments thereof, it is not to be so limited, since changes and alterations therein may be made which are within

What is claimed is:

1. A resinous composition comprising a liquid mixture of a liquid polymercaptan resin having an average molecular weight between about 300–25,000 and an SH equivalency of between about 0.05–4.0 milliequivalents per gram of resin, and between about 0.1–60 weight parts, basis 100 weight parts of said liquid resin, of a petroleum oil containing between about 0.05–50 percent of carbon atoms in aromatic molecules and having a viscosity above about 40 Saybolt Universal seconds at a temperature of 100° F.

2. The composition of claim 1 wherein said petroleum oil contains between about 0.05–35 percent of carbon atoms in aromatic molecules and contains not substantially above about 30 weight percent of polar compounds.

3. The composition of claim 1 wherein said polymercaptan resin has an average molecular weight between about 800–15,000 and an SH equivalency between about 0.2–3.6.

4. The composition of claim 1 wherein said polymercaptan resin and petroleum oil are combined into a homogeneous liquid blend prior to use.

References Cited

UNITED STATES PATENTS

| | | | |
|---|---|---|---|
| 3,265,651 | 8/1966 | Doppler et al. | 260—24 |
| 3,466,258 | 9/1969 | Panek et al. | 260—30.8 |

OTHER REFERENCES

Sealant, Adolfas Damusis, Reinhold Pub., pp. 186–205, May 16, 1968.

MORRIS LIEBMAN, Primary Examiner

R. ZAITLEN, Assistant Examiner

U.S. Cl. X.R.

260—47, 79